UNITED STATES PATENT OFFICE.

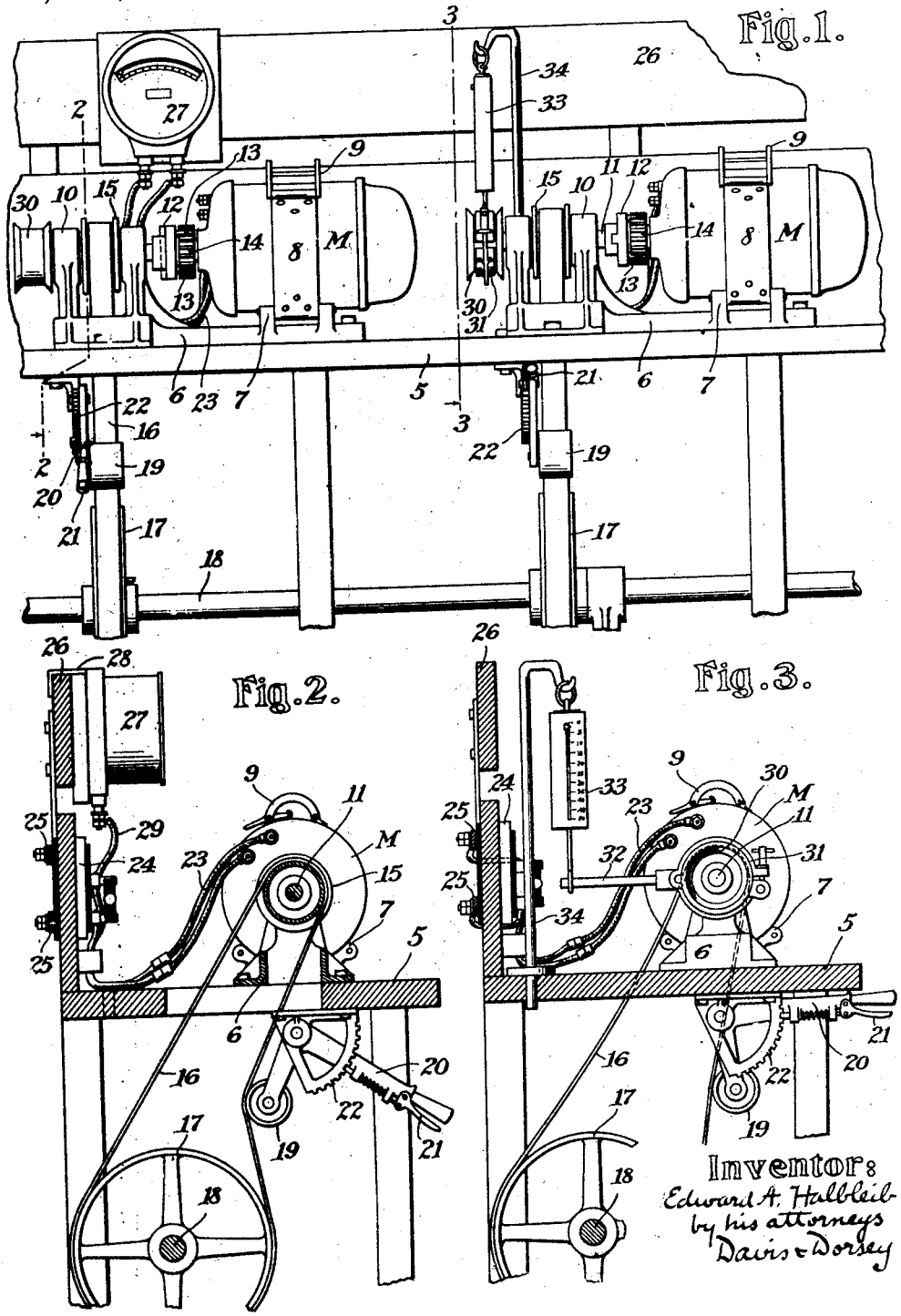

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

TEST-BENCH.

1,205,448.  Specification of Letters Patent.  Patented Nov. 21, 1916.

Application filed June 19, 1915. Serial No. 35,076.

*To all whom it may concern:*

Be it known that I, EDWARD A. HALBLEIB, a citizen of the United States, and resident of Rochester, in the county of Monroe and State of New York, have invented certain new and useful Improvements in Test-Benches, of which the following is a specification.

This invention relates to apparatus for use in testing dynamo-electric machines designed for use as both motors and generators, and is particularly useful in connection with small machines, of the kind in question, such as are used in electric engine-starting apparatus for automobiles.

In testing electric machines of the kind in question it is desirable to test them both as generators and as motors, and particularly to ascertain the current and electromotive force which they generate when they run at a definite speed, and the power and torque which they exert when energized by current of a definite electromotive force.

One object of the present invention is to produce testing-apparatus by means of which dynamo-electric machines may be tested with respect to the characteristics above mentioned, and to such others as may be desirable, in a convenient and simple manner and with a minimum amount of handling of the machines.

Another object of the invention is to provide for the testing of a considerable number of machines without the necessity of providing a large amount of expensive apparatus for the purpose.

To the foregoing ends the invention resides in a test-bench having simple and convenient means for supporting a dynamo-electric machine in coöperative relation with a countershaft, this countershaft being provided with means for coupling it to the armature-shaft of a dynamo-electric machine, and also with a brake-member or drum convenient for the application of a Prony brake, and in connection with the parts just described I provide means for connecting the countershaft, when necessary, with a source of power, and means for connecting the terminals of the electric machine with a source of current and an ammeter or other electrical measuring instrument.

Other objects of the invention, and the features of construction by which they are attained, will be set forth hereinafter, in connection with the following description of the illustrated embodiment of the invention.

In the accompanying drawings:—Figure 1 is a front-elevation of a portion of a test-bench constructed and equipped in accordance with the present invention, the figure showing two dynamo-electric machines in position for the performance of different tests; Fig. 2 is a vertical section on the line 2—2 in Fig. 1; and Fig. 3 is a vertical section on the line 3—3 in Fig. 1.

The invention is illustrated as embodied in apparatus comprising an elongated table or bench-top 5, in front of which the operator may stand. Upon this table are placed, at suitable intervals, metal frames 6 of which each is provided, at its right-hand portion, with a curved seat 7 in which a dynamo-electric machine or motor M of the inclosed type may be conveniently supported. In order to clamp the motor upon the seat metal straps 8 are pivoted to the seat and arranged to embrace the cylindrical casing of the motor, these straps being connected and tightened, at the top of the motor, by a toggle-device 9 of well-known form.

The left-hand end of the frame 6 is provided with two bearings 10 in which a countershaft 11 is journaled. This countershaft is provided, at its right-hand end, with a coupling 12 of the Oldham type, one member of the coupling carrying a set of pins 13. These pins are adapted to engage the teeth of a sprocket-wheel 14, with which the armature-shaft of the motor is provided, so that when the motor is placed in the seat it is necessary only to bring the sprocket-wheel into engagement with the pins in order to couple the armature-shaft to the countershaft, the countershaft being arranged to aline approximately with the armature-shaft, of a motor of the size for which the apparatus is designed, when this motor is clamped upon the seat. Any slight inaccuracy in alinement is accommodated by the Oldham coupling 12.

In testing the motor as a generator it is necessary to drive it from a suitable source of power. For this purpose the countershaft is provided, at the middle, with a pulley 15, and a belt 16 connects this pulley with one of a series of larger pulleys 17, on a power-shaft 18 which is journaled horizontally beneath the table. This power-shaft is connected with any suitable source of power, so as to be driven at a definite rate of speed.

The belt 16 is normally so loose that it does not cause the pulley 15 to be rotated, but each belt coöperates with an idler-pulley 19 which is carried by a bell-crank hand-lever 20 pivoted beneath the table. When the hand-lever is swung downwardly the belt is tightened, as shown in Fig. 2, and the lever is retained in either operative or inoperative position by a latch 21 coöperating with a toothed sector 22.

In testing the motor as a generator the terminals may be connected, in the usual manner, with a storage-battery or other device for absorbing the current generated, and in Fig. 2 the motor is shown as so connected by flexible conductors 23, which extend to a switch on a switch-board 24 at the back of the table. Through this switch-board the generator may be connected with bus-bars 25, which are connected with a storage-battery or any other suitable means (not shown) for receiving and discharging the current.

To measure the amount of current generated by the motor it is customary to use an electrical measuring-instrument, such as an ammeter, and where a large number of motors are to be tested the expense of providing an ammeter at each seat on the test-bench would be considerable. To avoid the necessity of such expense I employ an arrangement by which a single ammeter, or a limited number of such instruments, may be moved conveniently from place to place along the bench as required. For this purpose a support in the form of a horizontal rail 26 extends along the back of the table, and the instrument 27 is provided with a hook 28 by which it is suspended on the rail. The instrument may thus be slid along the rail to the point where its use is necessary, and may then be connected, by flexible conductors 29, with the corresponding switch-board, as shown in Figs. 1 and 2.

In testing the electric machine as a motor it is desirable to apply a Prony-brake or similar device, and in the present apparatus convenient provision for this purpose is made by providing the countershaft 11 with a brake-drum 30 at its left-hand end. This drum is adapted to receive an adjustable brake-band 31, which is shown in Fig. 3, provided with an arm 32 which is connected with a spring-balance 33. To avoid the necessity of providing a separate brake and spring-balance for each seat on the test-bench, the brake-band is divided, as shown, so as to be removable from the brake-drum, and the spring-balance is suspended on an upright 34 which may be inserted in and removed from a socket in the table 5, as shown particularly in Fig. 3.

It will be apparent that all the tests to which it is necessary to subject the dynamo-electric machine or motor may be conveniently performed while it is mounted on the seat and coupled to the countershaft, and no manipulation of the machine is required in the course of the testing, and thus the time and labor required are greatly reduced, while the apparatus is of such simple and convenient form that provision may be made, at a small expense, for testing a considerable number of machines simultaneously.

My invention is not limited to the embodiment thereof hereinbefore described and illustrated in the accompanying drawings, but may be embodied in various other forms within the nature of the invention as it is defined in the following claims.

I claim:—

1. In a test-bench, the combination of a seat and means for fixing a motor thereon; a countershaft journaled in position to aline with the armature-shaft of a motor on the seat, and provided with a brake-member and with means for coupling the countershaft to the armature-shaft; and means for connecting the countershaft with a source of power.

2. In a test-bench, the combination of a frame provided with shaft-bearings and a motor-seat; means for clamping a motor on said seat; a countershaft journaled in said bearings; a brake-drum on one end of the countershaft; a coupling-member for connecting the other end of the countershaft with the armature-shaft of a motor on said seat; and means for connecting the countershaft with a source of power.

EDWARD A. HALBLEIB.